(12) United States Patent
Maxson et al.

(10) Patent No.: US 7,733,429 B2
(45) Date of Patent: Jun. 8, 2010

(54) AUTOMATIC CONVERGENCE FOR IMAGE PROJECTION SYSTEMS

(75) Inventors: Brian Maxson, Riverside, CA (US); James E. Hicks, Laguna Beach, CA (US)

(73) Assignee: Mitsubishi Digital Electronics America, Inc., Irvine, CA (US)

( * ) Notice: Subject to any disclaimer, the term of this patent is extended or adjusted under 35 U.S.C. 154(b) by 1103 days.

(21) Appl. No.: 10/817,272

(22) Filed: Apr. 1, 2004

(65) Prior Publication Data

US 2005/0219425 A1    Oct. 6, 2005

(51) Int. Cl.
*H04N 3/22* (2006.01)
*H04N 9/28* (2006.01)

(52) U.S. Cl. .................. 348/745; 348/744; 348/807

(58) Field of Classification Search .......... 348/745, 348/744, 746–747, 806–807, 813–814, 177, 348/180–181, 189–190; 315/368.12, 368.11, 315/368.18, 368.24, 368.21; *H04N 3/22, H04N 9/28*
See application file for complete search history.

(56) References Cited

U.S. PATENT DOCUMENTS

| | | | |
|---|---|---|---|
| 4,485,394 A | 11/1984 | Ghaem-Maghami et al. | |
| 4,593,308 A | 6/1986 | Kemplin | |
| 4,686,429 A * | 8/1987 | Fendley | 315/368.12 |
| 5,345,262 A | 9/1994 | Yee et al. | |
| 5,497,054 A | 3/1996 | Ryu | |
| 5,883,476 A * | 3/1999 | Noguchi et al. | 315/368.12 |
| 5,898,465 A * | 4/1999 | Kawashima et al. | 348/745 |
| 6,707,509 B2 * | 3/2004 | Chauvin et al. | 348/745 |
| 6,717,625 B1 * | 4/2004 | Thielemans | 348/745 |
| 6,808,270 B2 * | 10/2004 | Nelson et al. | 353/69 |

* cited by examiner

*Primary Examiner*—Trang U Tran
(74) *Attorney, Agent, or Firm*—Orrick, Herrington & Sutcliffe LLP

(57) ABSTRACT

Systems and methods are provided that facilitate automatic convergence and geometry alignment in projection systems. Preferably, an optical element such as a lens array is coupled to all areas of the projection system's screen and to a detector element such as a photocell array. In operation, each lens of the lens array is adapted to map an individual portion or region of the screen onto the photocell array. A microprocessor, controller or the like uses the data output from the photocells to instruct an alignment controller to center or steer the beams to compensate for convergence error at a particular location. In a center alignment mode, four (4) or more beacon dots located about the periphery of the screen are detected to determine screen size and position, which is used to center the video image and the centers of the mapped regions on the screen.

10 Claims, 15 Drawing Sheets

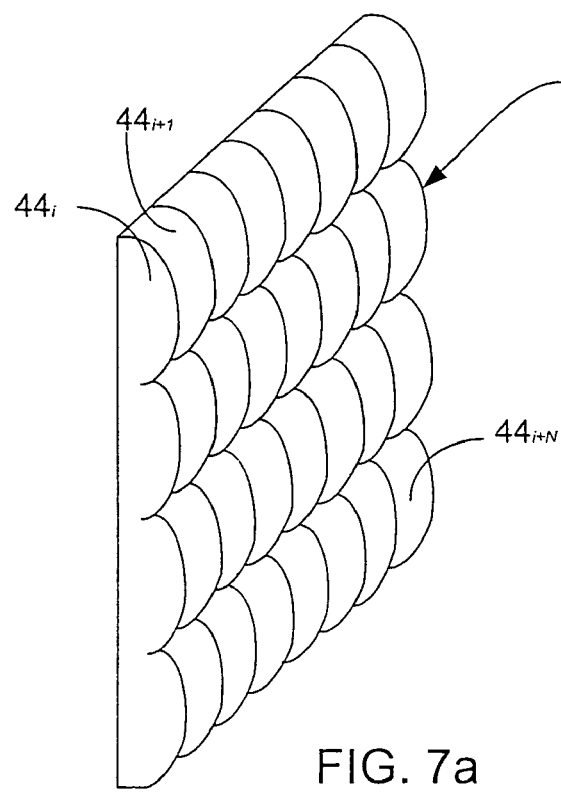 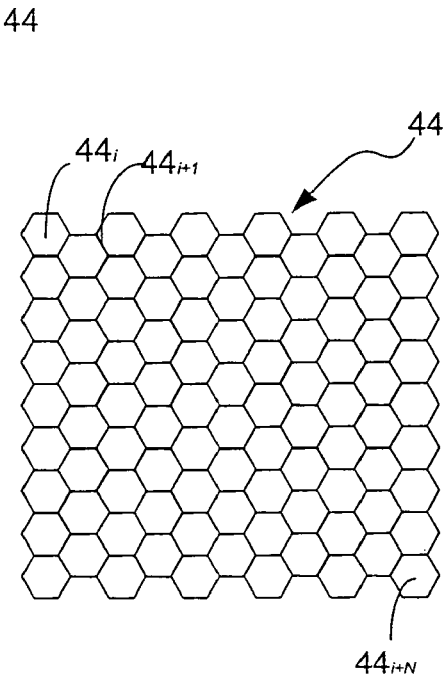
FIG. 7a  FIG. 7b
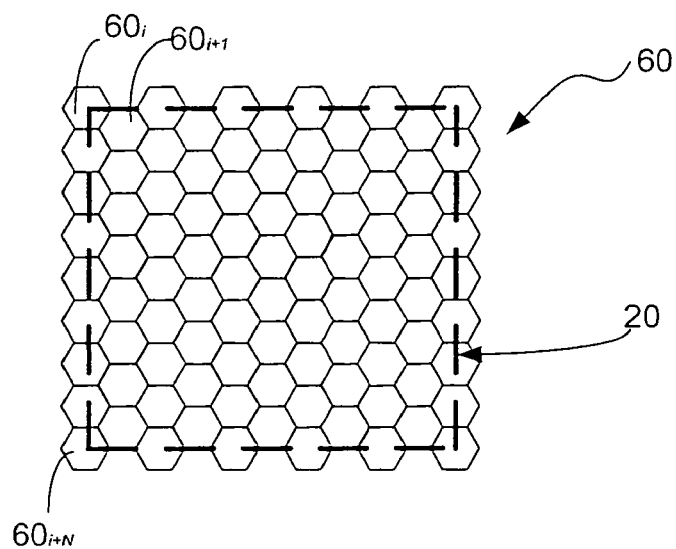
FIG. 8

|  | D1/D2 | D1/D3 | D2/D4 | D3/D4 |
|---|---|---|---|---|
| ON | ON_ACC | ON_ACC | ON_ACC | ON_ACC |
| OFF | < ON_ACC | < ON_ACC | ON_ACC | ON_ACC |

FIG. 15a

Located On Single Detector, D1

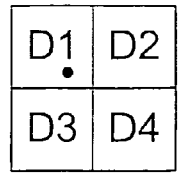

FIG. 15b

|  | D1/D2 | D1/D3 | D2/D4 | D3/D4 |
|---|---|---|---|---|
| ON | ON_ACC | ON_ACC | ON_ACC | ON_ACC |
| OFF | < ON_ACC | < ON_ACC | < ON_ACC | ON_ACC |

FIG. 16a

Centered Horiz Btwn D1 & D2 Along Vert Axis

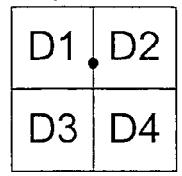

FIG. 16b

|  | D1/D2 | D1/D3 | D2/D4 | D3/D4 |
|---|---|---|---|---|
| ON | ON_ACC | ON_ACC | ON_ACC | ON_ACC |
| OFF | < ON_ACC | < ON_ACC | ON_ACC | < ON_ACC |

FIG. 17a

Centered Vert Btwn D1 & D3 Along Horiz Axis

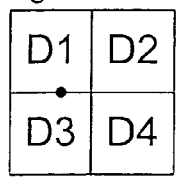

FIG. 17b

|  | D1/D2 | D1/D3 | D2/D4 | D3/D4 |
|---|---|---|---|---|
| ON | ON_ACC | ON_ACC | ON_ACC | ON_ACC |
| OFF | < ON_ACC | < ON_ACC | < ON_ACC | < ON_ACC |

FIG. 18a

Centered Vert & Horiz

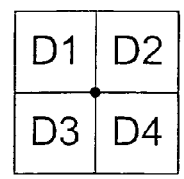

FIG. 18b

|  |  | Vert Axis | | Horiz Axis | |
|---|---|---|---|---|---|
|  |  | D1/D3 | D2/D4 | D1/D2 | D3/D4 |
| P1 | ON | ON_ACC | ON_ACC | ON_ACC | ON_ACC |
| P1 | OFF | < ON_ACC | ON_ACC | < ON_ACC | ON_ACC |
| P2 | ON | ON_ACC | ON_ACC | ON_ACC | ON_ACC |
| P2 | OFF | < ON_ACC | ON_ACC | < ON_ACC | ON_ACC |
| Pn | ON | ON_ACC | ON_ACC | ON_ACC | ON_ACC |
| Pn | OFF | ON_ACC | < ON_ACC | ON_ACC | < ON_ACC |

FIG. 19a

Find Vert Axis, Horiz Scan

| D1 | D2 |
|---|---|
| D3 | D4 |

FIG. 20a

Find Horiz Axis, Vert Scan

| D1 | D2 |
|---|---|
| D3 | D4 |

FIG. 20b

|  |  | Vert Axis | | Horiz Axis | |
|---|---|---|---|---|---|
|  |  | D1/D3 | D2/D4 | D1/D2 | D3/D4 |
| ON | P1 | SumP1 | SumP1 | SumP1 | SumP1 |
| ON | P2 | SumP2 = SumP1 | SumP2 = SumP1 | SumP2 = SumP1 | SumP2 = SumP1 |
| ON | Pn | SumPn < SumP1 | SumPn > SumP1 | SumPn < SumP1 | SumPn > SumP1 |

FIG. 19b

AUTOMATIC CONVERGENCE FOR IMAGE PROJECTION SYSTEMS

FIELD OF THE INVENTION

The invention relates generally to projection television systems and more particularly to systems and methods for automatic image alignment and convergence in image projection systems.

BACKGROUND INFORMATION

Projection television (PTV) systems and the like typically employ three separate cathode ray tube (CRT) projection units that project an image from each CRT to a common area of a projection screen superimposing the three separate monochromatic color images on one another to provide a single multi-color image. Precise superposition of the three different color images is essential in such a system to avoid degraded resolution and rough, blurred composite images. Thus, the projection units must be adjusted to maintain convergence of the images over the visible surface of the screen. These adjustments are initially made at the factory, but with age, temperature and other environmental conditions, it is often necessary to readjust the convergence in the field in order to maintain the quality of the image on the screen.

Various types of convergence systems, both manual and automated, have been developed to handle the necessary convergence adjustments. Manual convergence systems tend to be labor intensive, tedious and extremely time consuming, requiring hours to complete. Because the manipulator must often have technical knowledge or training sufficient to execute the manual convergence corrections, abilities that ordinary PTV purchasers seldom possess, manual convergence correction is typically accomplished by a skilled technician. In addition, because the manual procedure often requires the use of special test instrument, it may require the inconvenience of removing the PTV from the purchaser's home so that the adjustment can be made at a repair facility.

Although automated convergence systems tend to avoid the disadvantages associated with manual systems, they too have their limitations with respect to accuracy, speed, reliability and expense. One example of an automated convergence system includes the use of a mechanically scanning optical head that samples certain predetermined areas of a projected test pattern. The various mechanical elements and motors of such a system tend to add to its cost and complexity while detracting from system reliability. In addition, convergence accuracy tends to be dependent on motor accuracy and the process still tends to require several minutes to complete.

Another example of an automated convergence system includes the use of a series of photocells positioned at the edges of the projection screen to detect the size of successively projected test patterns. Such systems tend to only converge the very edges of the projection screen where the sensors are located. Often the middle of the screen, which is the most important area to the viewer, tends to be poorly aligned as a result.

In current systems, after convergence adjustment is done by measuring the convergence error between the images from the red, green and blue CRTs sensed in a few points on or around the screen, convergence error of all other points in the red, green and blue images is typically extrapolated by software from these points. Therefore, the more points of measurement, the closer the convergence of the red, green and blue images. Current systems tend to trade off between the number of measurable points and the cost of implementing the number of measurable points.

Accordingly, it would be desirable to provide an inexpensive automated convergence system that more accurately and more reliably achieves convergence over the entire screen without increasing the complexity and cost of the system.

SUMMARY

The present invention is directed to systems and methods that facilitate automatic convergence and geometry alignment in projection systems such as a CRT projection television (PTV) and the like. In a preferred embodiment, the automatic convergence system (ACS) of the present invention includes a convergence detector system mounted inside the light box of the PTV at a position that allows it to focus on all areas of the inside of a projection screen assembly of the PTV. The convergence detector system preferably comprises an optical unit, such as an array of lenses, e.g., convex, Fresnel and the like, or a hologram and the like, coupled to a detector element such as an array of photocells, photo detectors and the like. In operation, each lens or individual element of the optical element maps an individual portion or region of the screen and the image back reflected there from onto the detector element. A microprocessor, controller or the like uses the data outputted from the detector element to instruct deflection shaping circuitry to align, center or steer the beams from the projection systems to compensate for convergence error at a particular location.

In a center alignment mode, four (4) or more beacon dots positioned about the periphery of the screen are located by the convergence detector system to determine physical screen size and position. This information is used to center the video image and the centers of the mapped regions on the screen.

In another embodiment of the present invention, the convergence detection system is utilized to detect the operation of the keys or buttons on a front panel keyboard of the PTV and, thus, enable wireless operation of the front panel keyboard keys or buttons. When pressed, the keys or buttons preferably deflect reflectors to a position where the reflectors reflect light from projected images back to the convergence detection system.

In an alternative embodiment, the convergence detection system preferably comprises a single photocell having a lens, such as, e.g., a fish or insect eye lens, coupled thereto.

In another alternative embodiment, the convergence detection system is utilized with the folded-optical system in "nearly-flat" rear projection TVs, whether implemented by multiple-optical-path technologies (e.g. CRTs) or by single-optical-path technologies (e.g. DLP or LCD). The PTV preferably comprises a projection system and a detector coupled to a first mirror which is coupled to a second mirror, which in turn is coupled to a display screen. The shallowness of the display's enclosure requires that the physical alignment between the first and second mirrors, and the display screen, be maintained very accurately. To maintain accurate alignment, the first and/or second mirrors are outfitted with positioning devices comprising one or more linear motors or actuators. Alternatively, an actuator can move the digital device (or devices) to achieve proper alignment of the digital device image(s) with the viewing screen in multiple (nearly flat) or single mirror systems. Furthermore, in the case of multiple digital device displays, such apparatus can also be used to align the image from each device to achieve properly indexed images much the same way that CRT convergence is accomplished.

Other systems, methods, features and advantages of the invention will be or will become apparent to one with skill in the art upon examination of the following figures and detailed description.

BRIEF DESCRIPTION OF THE FIGURES

The details of the invention, including fabrication, structure and operation, may be gleaned in part by study of the accompanying figures, in which like reference numerals refer to like parts. The components in the figures are not necessarily to scale, emphasis instead being placed upon illustrating the principles of the invention. Moreover, all illustrations are intended to convey concepts, where relative sizes, shapes and other detailed attributes may be illustrated schematically rather than literally or precisely.

FIG. 7A depicts a perspective view of a lens array of the automatic convergence system of the present invention.

FIG. 7B depicts a plan view of the lens array.

FIG. 8 depicts a plan view illustrating the regions of measurement (ROM) over-laid on the screen of the PTV.

FIGS. 15a, 16a, 17a and 18a depict tables illustrating the accumulator values related to the location of a detected spot.

FIGS. 15b, 16b, 17b and 18b depict plan views of the detector element illustrating the location of a detected spot.

FIGS. 19a and 19b depict tables illustrating the accumulator values related to locating the vertical and horizontal center axes of an individual ROM.

FIGS. 20a and 20b depict plan views of the detector element illustrating horizontal and vertical scanning to detect vertical and horizontal axes of an individual ROM.

DETAILED DESCRIPTION

The systems and methods described herein provide for automatically aligning convergence and geometry in projection systems such as a CRT projection television (PTV) and the like. More particularly, the automatic convergence system (ACS) of the present invention includes an automatic convergence detector system preferably mounted inside the light box of the PTV, which allows the detector system to detect images reflected off of all areas of the inside of a projection screen assembly of the PTV.

The automatic convergence process (ACP) of the present invention preferably provides a method in which the beams from each of the projection units of a multi-unit projection system such as three (3) CRTs, multiple digital display chips, and the like are converged at several locations across the entire screen by dividing the screen into several smaller regions and then centering the beams within each of those regions, wherein the number (N) of convergence locations or regions depends on the desired resolution of convergence. The ACP preferably takes place when the PTV is not otherwise in use, i.e., no video image or on-screen (OSD) is being shown. The ACP may be initiated periodically by schedule or by detection of changes known to affect convergence such as being jarred or changes in temperature or humidity. The PTV then waits for an available time and then initiates the ACP. In some preferred embodiments, the ACP may run continuously.

Figure 1:
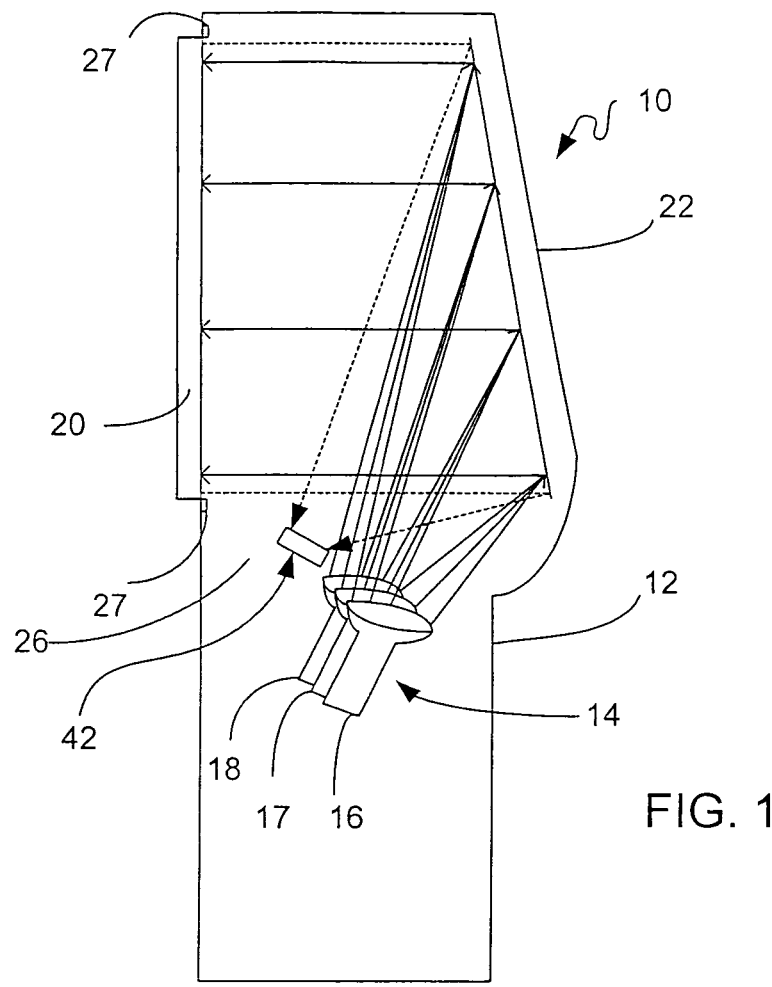
FIG. 1 depicts a side view of a projection television (PTV) comprising an automated convergence system in accordance with the present invention.
Figure 2:
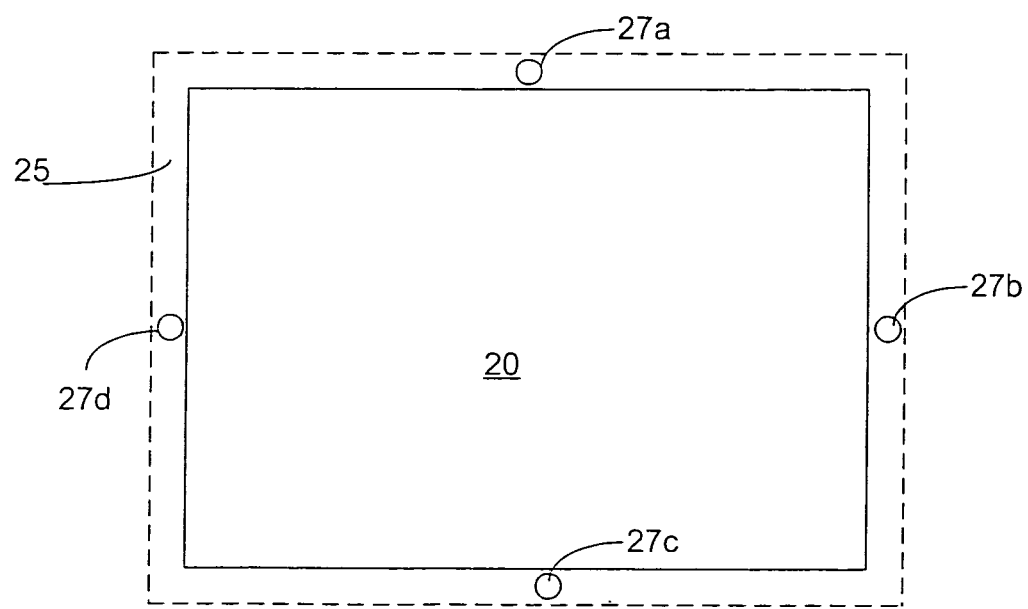
FIG. 2 depicts a plan view of the inside of a projection screen of the PTV shown in FIG. 1.

Turning in detail to the figures, FIG. 1 depicts a PTV 10 comprising a cabinet or enclosure 12, an image projection system 14 that includes three CRTs 16, 17 and 18 corresponding to three separate colors—red, green and blue—mounted in the cabinet, a projection screen assembly 20 attached to the front of the cabinet 12, and a mirror 22 mounted in the interior of the cabinet 12 and optically coupled to the projection screen assembly 20 and the image projection system 14. An automatic convergence process (ACP) detector system 42, which is part of an automatic convergence system (ACS) of the present invention, is shown mounted within the light box 26 of the PTV 10 and optically coupled to the inside of the screen assembly 20 and the over-scan area around the screen 20. As depicted in FIG. 2, all PTVs typically have an over-scan area 25 around the screen 20 and onto which an image is projected beyond the borders of a screen 20.

In addition to the ACP detector system 42, the ACS includes a series of beacon dots 27, preferably at least four (4) dots 27a-d, on the inside of the cabinet 12 in the over-scan area 25 about the screen assembly 20. The beacon dots 27 can be some reflective material, a mirror, and the like, or, preferably, simply dots of white paint, to provide an increased intensity in reflective light at the location of the beacon dot 27.

Figure 3:
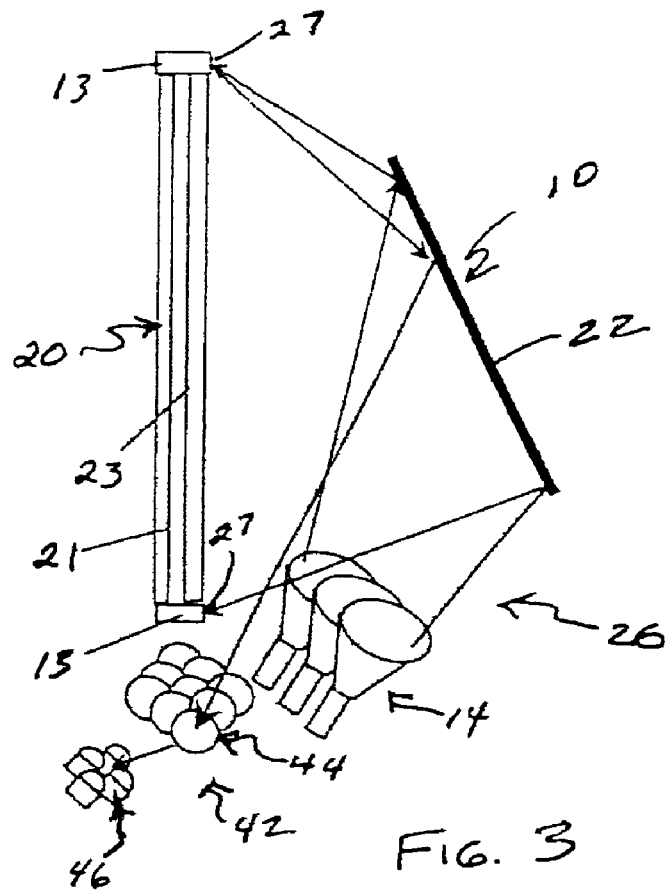
FIG. 3 depicts a partial detail side view of the PTV shown in FIG. 1.

Referring to FIG. 3, the screen assembly 20 preferably includes a Fresnel lens 23 coupled with a lenticular screen 21 on its interior side and held in place by a screen frame 13. The translucent properties of the Fresnel lens 23 are such that an image projected from the front of the projection screen 20 also reflects off the inside of the Fresnel lens 23 where it can be detected by the ACP detector system 42. The ACP detector system 42 preferably includes an optical element 44 optically coupled to the mirror 22, the screen assembly 20 and the over-scanned area, and a detector proper or element 46 comprising an array of photocells or photodetectors. As depicted in greater detail in FIGS. 7a and 7b, the optical element 44 preferably comprises an array of hexagonal convex lenses $44_i, 44_{i+1}, \ldots 44_{i+n}$. The function of each separate lens $44_i, 44_{i+1}, \ldots 44_{i+n}$ is to direct one (hexagonal) part of an image back-reflected off of the Fresnel lens 23 onto the detector element 46. Although the optical element 44 is depicted as an array of hexagonal lenses $44_i, 44_{i+1}, \ldots 44_{i+n}$, it may comprise an array of lenses having lenses of any geometric shape sufficient to closely pack as many lenses as possible in the array, an array of Fresnel lenses as is done in passive IR motion detectors, or a hologram such as those used in barcode scanners (see U.S. Pat. No. 4,22,509).

Figure 5:
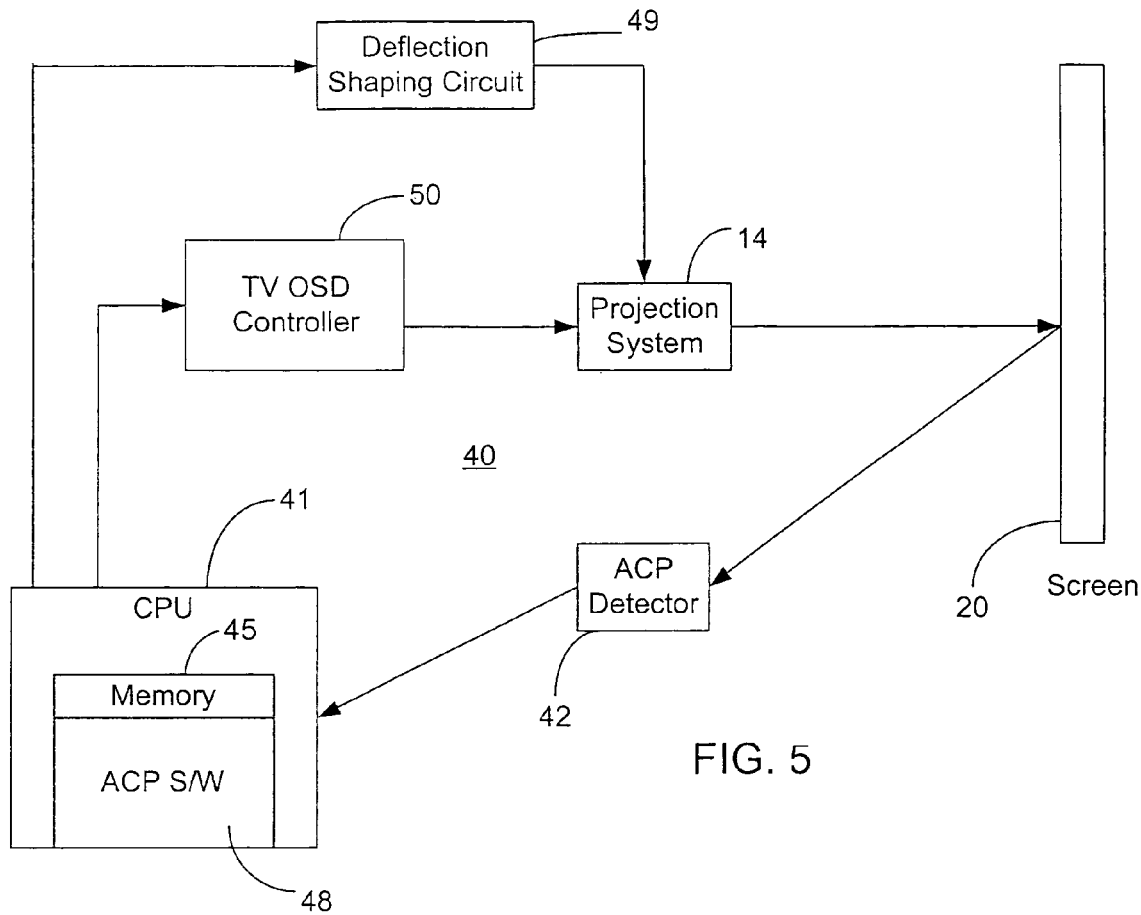
FIG. 5 depicts a schematic of the automatic convergence system of the present invention.

Referring to FIG. 5, a preferred embodiment of the ACS 40 of the present invention is shown. As depicted, the ACS 40 comprises a ACP detector system 42 coupled to the screen 20. The ACP detector system 42 is also preferably coupled to a controller, microprocessor or CPU such as the PTV's microprocessor or CPU 41 which runs the ACP software 48. The microprocessor 41 preferably includes non-volatile memory 45 in which the ACP software 48 is stored. The microprocessor 41 uses the PTV's on screen display (OSD) controller 50, which is coupled to the projection system 14, to turn "ON" and "OFF" one spot at a time, and project that spot onto the screen to conduct the ACP. In the case of a CRT projection system, the OSD controller turns on and off one spot in one CRT at a time. From the small amount of back-reflectance from the Fresnel lens 23, the image of that spot returns to the ACP detector system 42.

Figure 6:
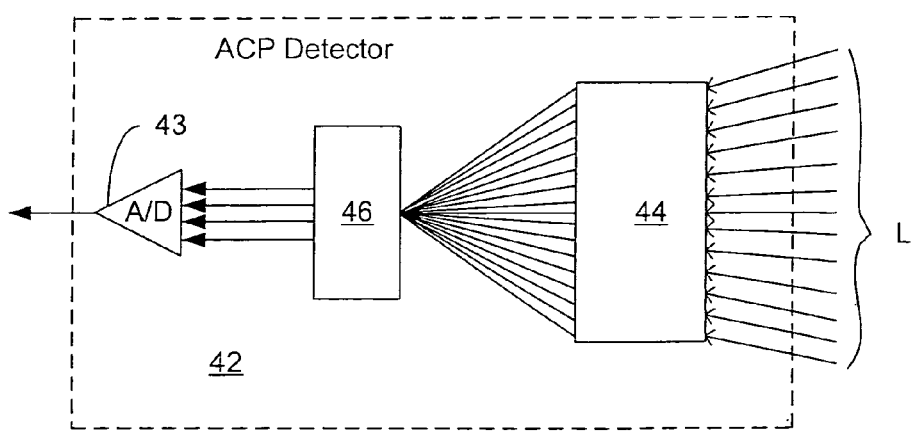
FIG. 6 depicts a detail schematic of an ACP detector of the automatic convergence system of the present invention.
Figure 11:
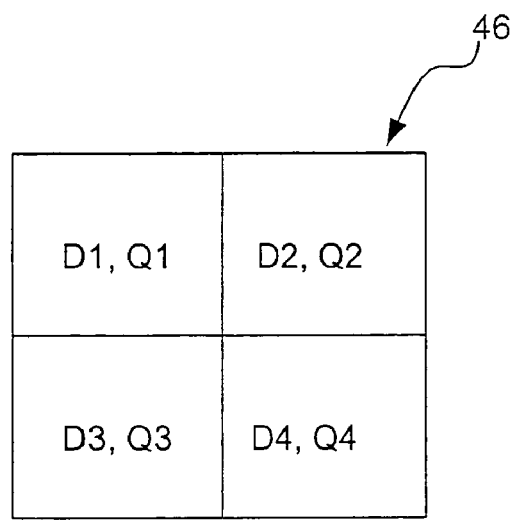
FIG. 11 depicts a plan view of four (4) photodiodes arrayed to form an ACP detector proper of the ACP detector system.
Figure 12:
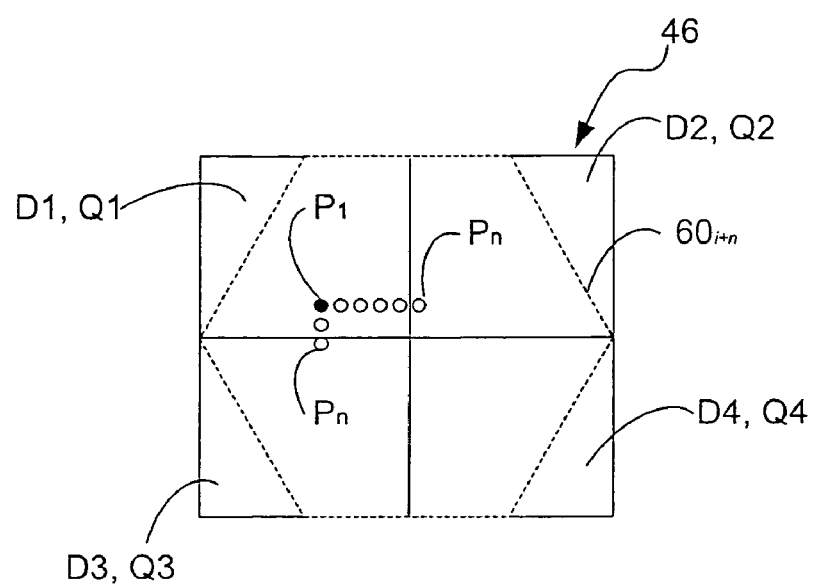
FIG. 12 depicts a plan view of the ACP detector proper detecting images from an individual ROM of the PTV screen.

As depicted in FIG. 6, the back-reflected light L from the image of one spot enters the optical element 44, as shown from the right, and is directed onto the detector element 46 preferably comprising a minimum of four (4) optically separate but adjacent photodetectors D1, D2, D3 and D4 (see FIG. 11). The electrical output of each of these photodetectors are roughly digitized by an analog-to-digital (A/D) converter element 43 and made available to the ACP software 48 running on the microprocessor 41 providing current feedback regarding the position of the spot. The microprocessor 41 uses the data received from the ACP detector system 42 to instruct deflection shaping circuitry 49 to align, center or steer the beams of the CRTs to compensate for convergence error at a particular pixel location.

Figure 9:
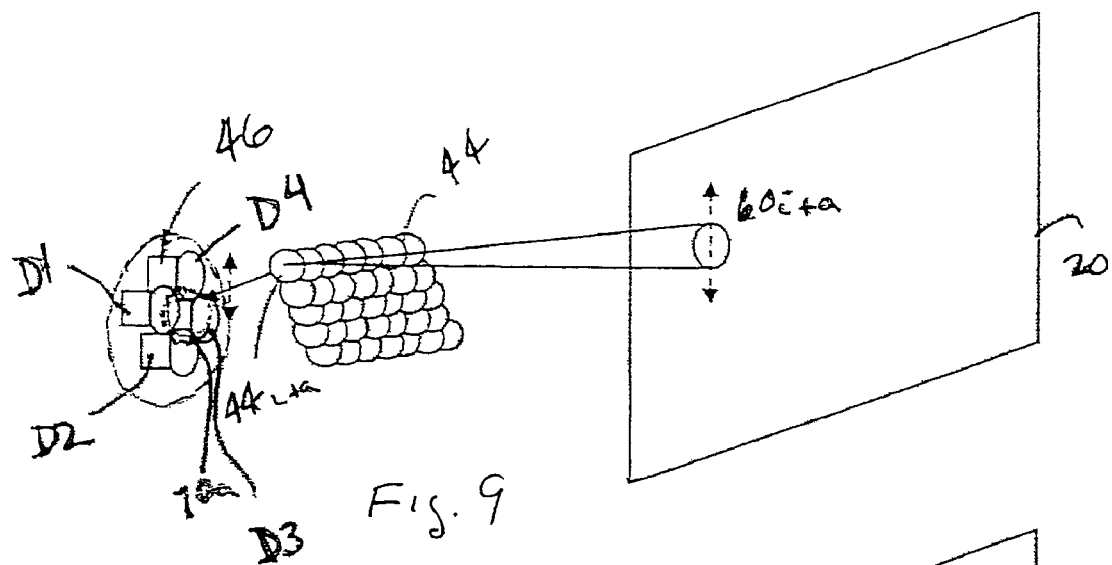
FIG. 9 depicts a perspective view of the ACP detector system detecting images from an individual ROM of the PTV screen.
Figure 10:
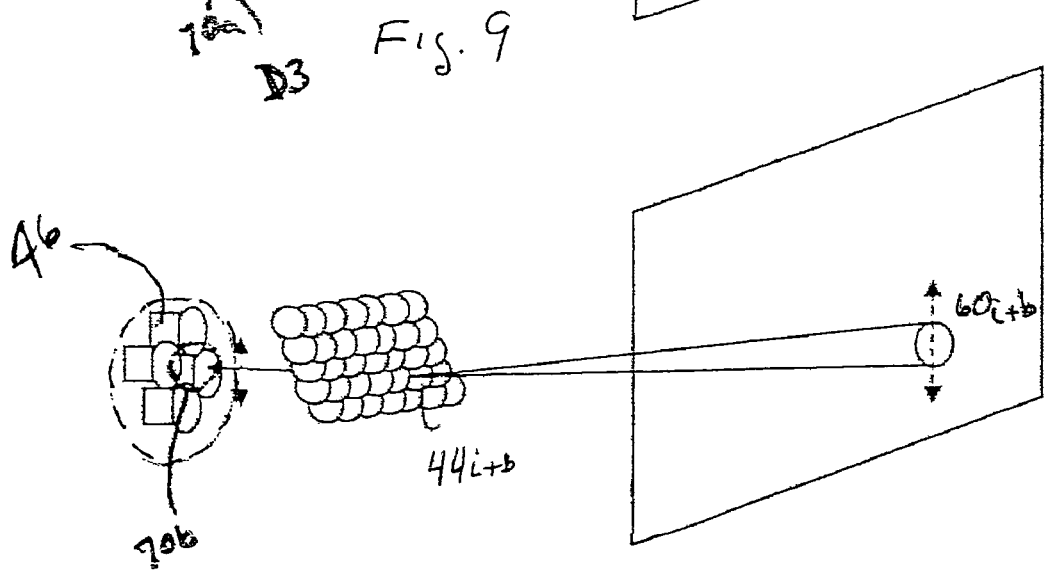
FIG. 10 depicts a perspective view of the ACP detector system detecting images from another individual ROM of the PTV screen.

As FIGS. 7a, 7b and 8 indicate, the optical element 44 preferably includes as many separate lenses or elements as the desired number (N) of regions of measurement (ROMs) 60 the screen 20 is divided into. FIG. 8, in particular, shows the back-reflected screen image divided into several separate but adjacent ROMs $60_i, 60_{i+1}, \ldots 60_{i+n}$ forming an array of ROMs 60. Each ROM $60_i, 60_{i+1}, \ldots 60_{i+n}$ is a region imaged or mapped by one of the lenses $44_i, 44_{i+1}, \ldots 44_{i+n}$ onto the detector element 46. As shown in FIG. 9, one of the lenses $44_{i+a}$ creates a virtual image 70a corresponding to its ROM $60_{i+a}$ within screen 20, onto the surface of the detector element 46. FIG. 10 shows a second lens $44_{i+b}$ creating a second virtual image 70b corresponding to its ROM $60_{i+b}$, onto the detector element 46, (coincident with 70a in FIG. 9).Accordingly, each lens $44_i, 44_{i+1}, \ldots 44_{i+n}$, images a different part of the screen 20 onto the detector element 46. As a result, the detector element 46 sees every part of the screen 20 through one or more of the lenses $44_i, 44_{i+1}, \ldots 44_{i+n}$. Although the detector element 46 cannot tell into which ROM 60 a spot of light falls, it can tell the spot's position within its ROM 60 and locate the center of that ROM.

Figure 13:
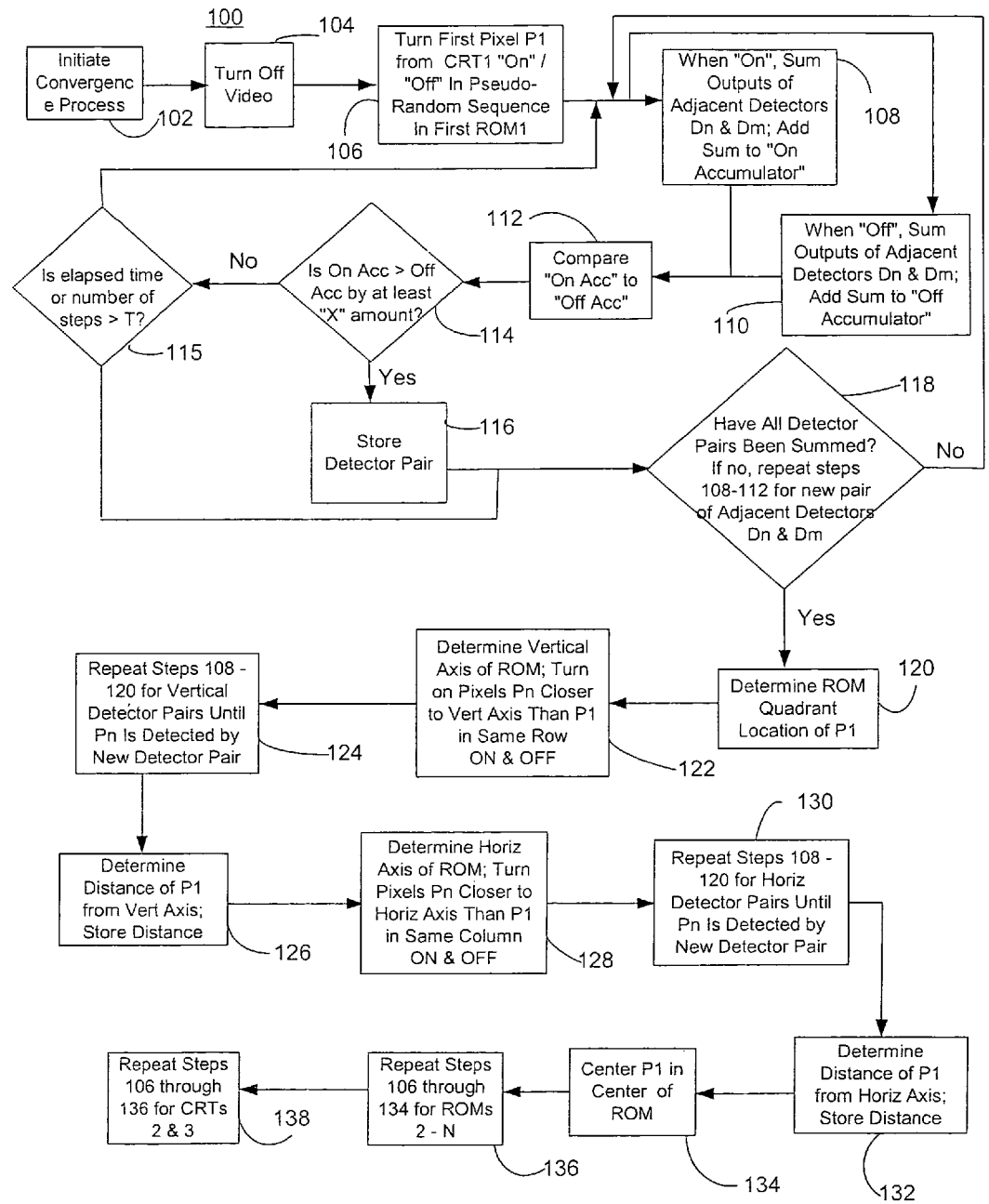
FIG. 13 depicts a flow chart illustrating a preferred embodiment of the automatic convergence process of the present invention.

As indicated in FIGS. 12, 15b, 16b, 17b, 18b, 20a and 20b, the ACP of the present invention allows for the location of the center of a ROM 60 to be determined by positioning a spot within that ROM, and "moving" it such that detector element 46 can tell when it reaches the center of the ROM. This process may be repeated for each ROM, giving the center position of each ROM about which multiple CRTs can be aligned and, thus, correcting convergence errors at particular pixel locations. Referring to FIG. 13, a flow chart illustrating the steps to the ACP 100, including spot location, ROM center location, and convergence error correction, is provided.

The ACP 100 is initiated at step 102 by schedule or by detection of changes known to affect convergence such as being jarred or changes in temperature or humidity, or may run continuously. The video image or other OSDs are preferably turned off at step 104. At step 106, a first spot, P1, from a first CRT1, is turned ON and OFF in a pseudo-random sequence (see FIG. 21a). The first spot P1 is preferably a spot corresponding to the central pixels of the first CRT1 for that region of the screen 20. When ON, the back reflected light is imaged onto the detector element 46 by the optical element 44 and the sum of the outputs of a pair of adjacent detectors, Dn and Dm, is added to an ON Accumulator at step 108. When OFF, the sum of the outputs of the same pair of adjacent detectors, Dn and Dm, is added to an OFF Accumulator at step 110. At step 112, the values of the ON and OFF Accumulators are compared and, at step 114, if the ON Accumulator value is greater than the value of the OFF Accumulator by at least the amount "X", an amount sufficient to ensure certainty as to the difference between the detected signals, the identity of the detector pair is stored, at step 116, as having detected the spot.

Figure 21A:
FIGS. 21a through 21e depict graphs illustrating the limitation of the affects of noise on the system of the present invention.
Figure 21B:
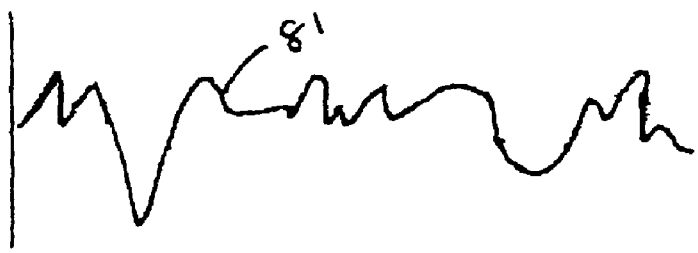
Figure 21C:
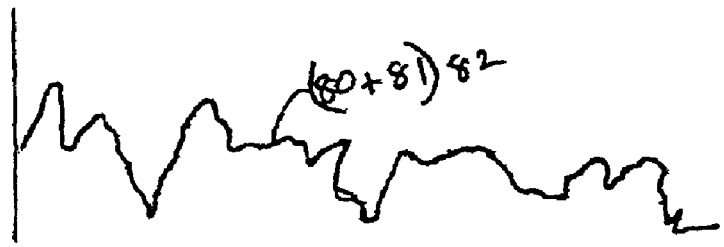
Figure 21D:
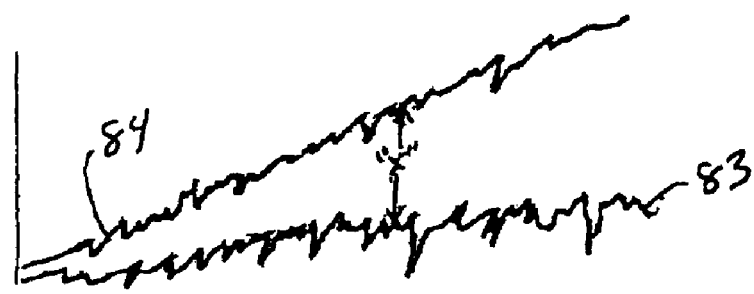
Figure 21E:
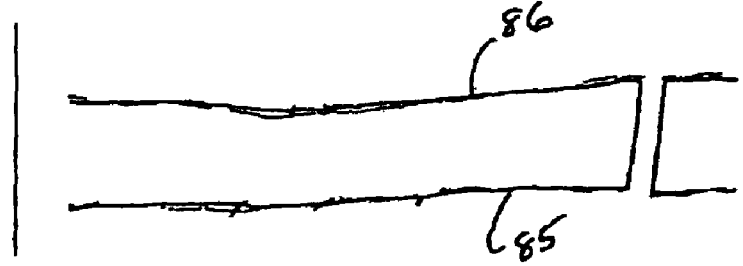

As depicted in FIGS. 21a through 21e, the ACP tends to be unaffected by noise in the system and preferably scales itself in time to correct for changes in noise, such as an increase or decrease in ambient light, by simply taking longer or shorter to complete depending on the magnitude of the complicating factors. In FIG. 21a, the curve 80 depicts a light signal over time corresponding to the illumination of a spot in a pseudo-random sequence. In an ideal situation, i.e., a noise free environment with infinite resolution components, the output of detector pairs D1/D3 and D2/D4 when the light is detected by the pairs is depicted by curves 86 and 85 shown in FIG. 21e. The system, however, typical includes light, electric and other noise indicated by curve 81 in FIG. 21b. Without any other processing, the output of the detector pairs are indistinguishable from the noise as indicated by curve 82 in FIG. 21c. By summing the output of a detector pair when the spot is turned ON and adding it to an ON Accumulator over time and summing the output of a detector pair when the spot is turned OFF and adding it to an OFF Accumulator over time, the difference in the values of accumulators will increase over time, as indicated by curves 84 and 83 in FIG. 21d, to a magnitude "X" that provides sufficient certainty that the detectors have detected the reflected image of the illuminated spot.

Returning to FIG. 13, if at step 114 the ON Accumulator is not greater than the OFF Accumulator by at least "X", and if at step 115 the elapsed time or number of times steps 108 through 114 have been repeated is not greater than at least "T", steps 108 through 114 are repeated. As step 118 indicates, steps 108 through 112 are repeated until the outputs of all possible detector pairs have been summed and compared. Once the outputs of all of the detector pairs have been summed and compared, the location of the first spot P1 within the ROM 60 can be determined at step 120. FIGS. 15a through 18b provide exemplary relative accumulator values and spot positions.

As shown in FIGS. 15a and 15b, if the ON Accumulator value is greater than the OFF Accumulator value for detector pairs D1/D2 and D1/D3, the spot is located in the upper and left halves of the ROM. If, as depicted in FIGS. 16a and 16b, the ON Accumulator value is greater than the OFF Accumulator value for detector pairs D1/D2, D1/D3 and D2/D4, the spot is horizontally centered and located in the upper half of the ROM. If, as depicted in FIGS. 17a and 17b, the ON Accumulator value is greater than the OFF Accumulator value for detector pairs D1/D2, D1/D3 and D3/D4, the spot is vertically centered and located in the left half of the ROM. If, as depicted in FIGS. 18a and 18b, the ON Accumulator value is greater than the OFF Accumulator value for all the detector pairs, the spot is vertically and horizontally centered within the ROM.

Once the position of the spot P1 is determined, and if the spot is not located at the center of the ROM 60, the center of the ROM 60 can be determined and the convergence error associated with the position of the spot P1 can be corrected. The ACP can search for a centerline of a ROM by successively lighting spots in a row or column. By scanning horizontally (see FIGS. 12 and 20a) the ACP can note when the lighted spot crosses between the left and right halves of the detector element 46 and ROM 60, and by scanning vertically (see FIGS. 12 and 20b) the ACP can note when the lighted spot crosses between the upper and lower halves of the detector element 46 and ROM 60.

If the spot P1 is located in the ROM 60 somewhere other than along the vertical axis of the ROM 60, see, e.g., FIGS. 12, 15b, 17b, 20a or 20b, the vertical axis of the ROM 60 can be determined, at step 122, by turning spots ON and OFF, one at a time, in the same row as the first spot P1 and closer to the vertical axis of the ROM 60, in a pseudo-random sequence. Next, at step 124, steps 108 through 120 are repeated for vertical detector pairs D1/D3 and D2/D4 to determine when a spot Pn is detected by a different detector pair than the first spot P1. FIGS. 19a and 20a provide exemplary relative accumulator values and spot positions as the ACP scans horizontally to find the vertical axis of the ROM. As shown, the ON and OFF Accumulator values are the same for each of the detector pairs until a spot Pn is detected by detector pair D2/D4, as indicated by the OFF Accumulator for detector pair D2/D4 registering a value lower than the ON Accumulator value minus a predetermined certainty value, indicating the vertical axis of the ROM had been crossed-over. Further confirmation that the vertical axis had been crossed-over is indicated by the OFF Accumulator for detector pair D1/D3 registering a value the same as its ON Accumulator value. Alternatively, the ACP could simply repeat steps 108 through 120 for the detector pair that did not detect the first spot P1, in this instance detector pair D2/D4.

In a further alternative, the ACP, as depicted in FIG. 19b, could monitor the outputs (sums) of each vertical detector pair or the output of the vertical detector pair that did not detect the first spot P1, i.e., detector pair D2/D4 in this instance, when each successive spot Pn is turned ON and compare the output (sum) to the detector pair output when the first spot P1 was turned ON. When the output of detector pair D2/D4 rises or when the output of detector pair D2/D4 rises and the output of detector pair D1/D3 drops, as indicated in FIG. 19b for spot Pn, the vertical axis has been crossed.

Once the location of the vertical axis is determined, the distance of the first spot P1 from the vertical axis is determined and stored at step 126.

Next, the horizontal axis of the ROM 60 can be determined, at step 128, by turning spots ON and OFF, one at a time, in the same column as the first spot P1 and closer to the horizontal axis of the ROM 60, in a pseudo-random sequence. Next, at step 130, steps 108 through 120 are repeated for horizontal detector pairs D1/D2 and D3/D4 to determine when a spot Pn is detected by a different detector pair than the first spot P1. FIGS. 19a and 20b provide exemplary relative accumulator values and spot positions as the ACP scans vertically to find the horizontal axis of the ROM. As shown, the ON and OFF Accumulator values are the same for the detector pair D3/D4 until a spot Pn is detected by this pair, at which time the OFF Accumulator value registers lower than the ON Accumulator value indicating the horizontal axis of the ROM had been crossed-over. The same alternatives discussed in regard to locating the vertical axis apply to locating the horizontal axis; see FIG. 19b.

Once the location of the horizontal axis is determined, the distance of the first spot P1 from the horizontal axis is determined and stored at step 132. Using the distance of the first spot P1 from the vertical and horizontal axes of the ROM 60, the convergence error corresponding to this position of the first spot P1 is corrected and the spot is steered to the center of the ROM 60 at step 134.

Convergence errors for the first CRT1 are corrected for N positions across the screen 20 at step 136 by repeating steps 106 through 134 for $ROMS_{2-N}$. Convergence errors for the second CRT2 and third CRT3 are corrected for N positions across the screen 20 at step 138 by repeating steps 106 through 136 for the second and third CRTs 2 and 3.

In addition and prior to centering or converging the beams of each of the CRTs 14 to the center of each or several of the ROMs 60, it is also desirable to align the centers of the ROMs 60 to the physical position of the screen 20 within the PTV 10 and, thus, center the video image on the screen 20. Aligning the centers of the ROMs 60 to the screen 20 is accomplished by locating the beacons 27 positioned about the screen 20 in the over scanned area 25. The accuracy or preciseness of the alignment of the ROM centers and, thus, the video image on the screen 20 is dependent upon the preciseness in which the beacons 27 are positioned relative to the screen 20. It is thus desirable to position the beacons 27 relative to the screen 20 within a relative small margin of error.

Figure 14:
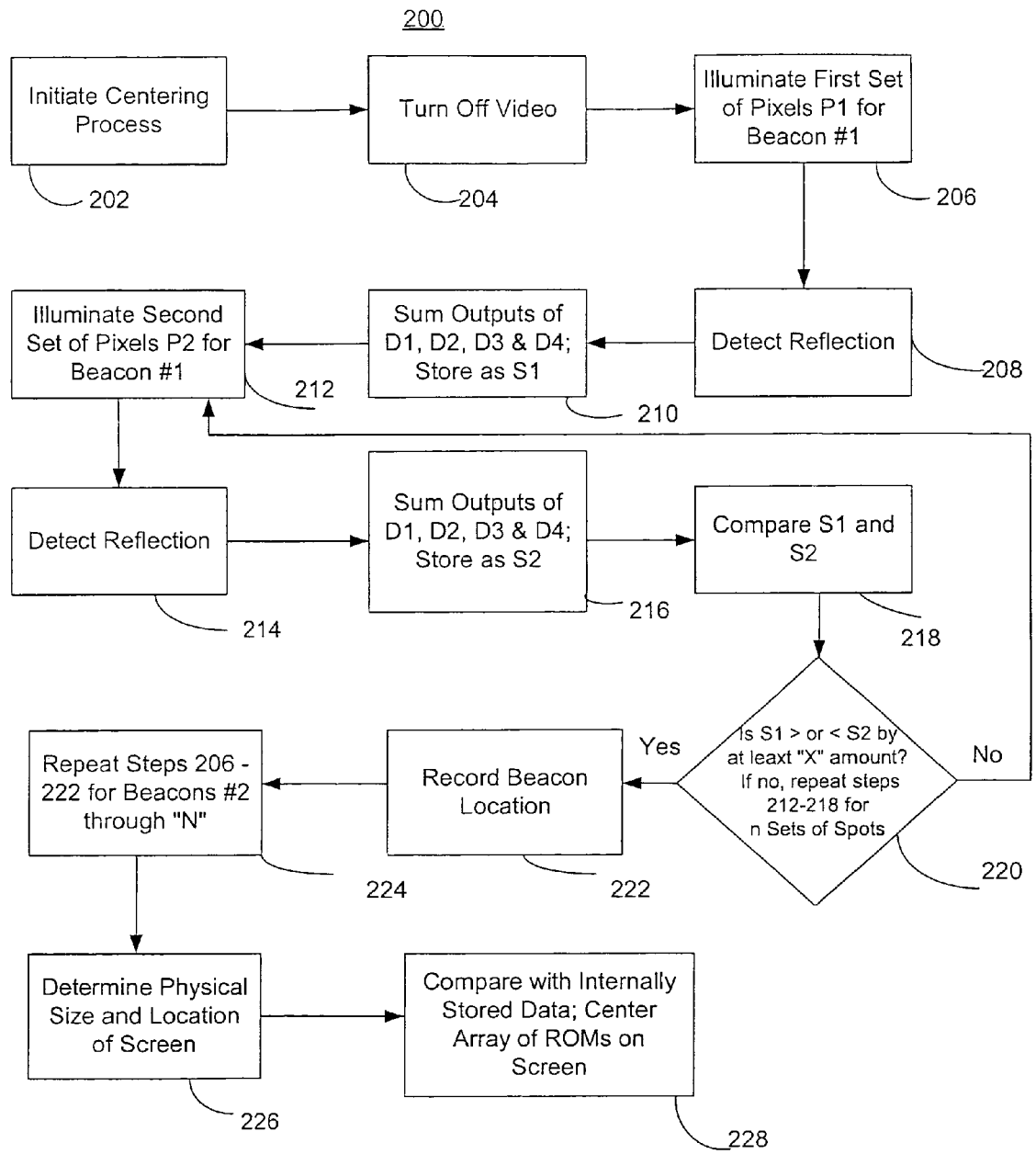
FIG. 14 depicts a flow chart illustrating a preferred embodiment of the automatic centering process of the present invention.

Since the beacons 27 fall outside the visible portion of the screen 20, but still within the range of pixels available to the OSD, i.e., the over scanned area 25 (see FIG. 2), the ACP detector system can locate them. The ROM centering process 200 is provided in FIG. 14 and can be initiated, at step 202, manually by accessing the PTV's menu structure or by schedule or by detection of changes known to affect convergence such as being jarred or changes in temperature or humidity, or may be running continuously. At step 204, any video or other OSD is turned off and, at step 206, the ACS illuminates a first set of spots P1, preferably all of the pixels from all of the CRTs 14 in an area where the ACS believes the beacon 27 to be located. At step 208, the ACP detector system 42 detects the back-reflected image of the illuminated spots P1. The output of each of the detectors D1, D2, D3 and D4 are summed and then stored as S1 at step 210. Next, at step 212, the ACS illuminates a second set of spots P2 preferably all of the pixels in an area adjacent to the area where the ACS believes the beacon to be located. At step 214, the ACP detector system 42 detects the back-reflected image of the illuminated spots P1. The output of each of the detectors D1, D2, D3 and D4 are then summed and stored as S2 at step 216. The sums S1 and S2 are compared at step 218. The ACS determines, at step 220, whether sum S1 is less than or greater than sum S2 by at least an amount "X" to insure with sufficient certainty that the ACP detector system 42 detected a reflection off of a beacon 27. If YES, the location of the beacon is recorded at step 222. If NO, steps 212 through 218 are repeated for N sets of spots scanned vertically and horizontally from the location at which the first set of spots were pointed until the ACS determines with sufficient certainty that ACP detector system 42 detected a reflection off of a beacon. Next, at step 224, steps 206 through 222 are repeated to locate the remaining beacons. The ACS then uses the beacon locations to determine the actual physical size and location of the screen 20 at step 226. This data is then compared, at step 228, with the originally stored data of where the beacon's should have been located and used to center the video image and ROMs on the screen 20.

FIG. 2 only shows four (2) beacon dots 27, which is the minimum required for the aligning process 200. It is, however, desirable to increase the number of beacon dots 27 about the perimeter of the screen 20 to increase the number of points available to the ACS to be used for correcting horizontal and/or vertical non-linearities. The beacon dots 27 should not be too close together, i.e., within the potential maximum horizontal and vertical non-linearities, to avoid the undesirable result of aliasing from adjacent beacon dots 27.

To avoid the occurrence of aliasing during the ACP, convergence of the three (3) CRTs must be close enough to being converged or the convergence error must be small enough that when a CRT 14 aims a spot of light at the screen it hits somewhere within the intended ROM and not in an adjacent ROM. Although the ACP detector system 42 can distinguish the position of a spot within its ROM, it cannot distinguish between the image from one ROM to another. One method of avoiding aliasing in the ACP would be to run the alignment process 200 (FIG. 14), prior to running the ACP 100 (FIG. 13), for each CRT 14 individually and then extrapolating the correction for the beacon dots 27 to as many locations throughout the screen as desired and, thus, roughly reducing the convergence for each CRT throughout the screen 20.

Figure 22A:
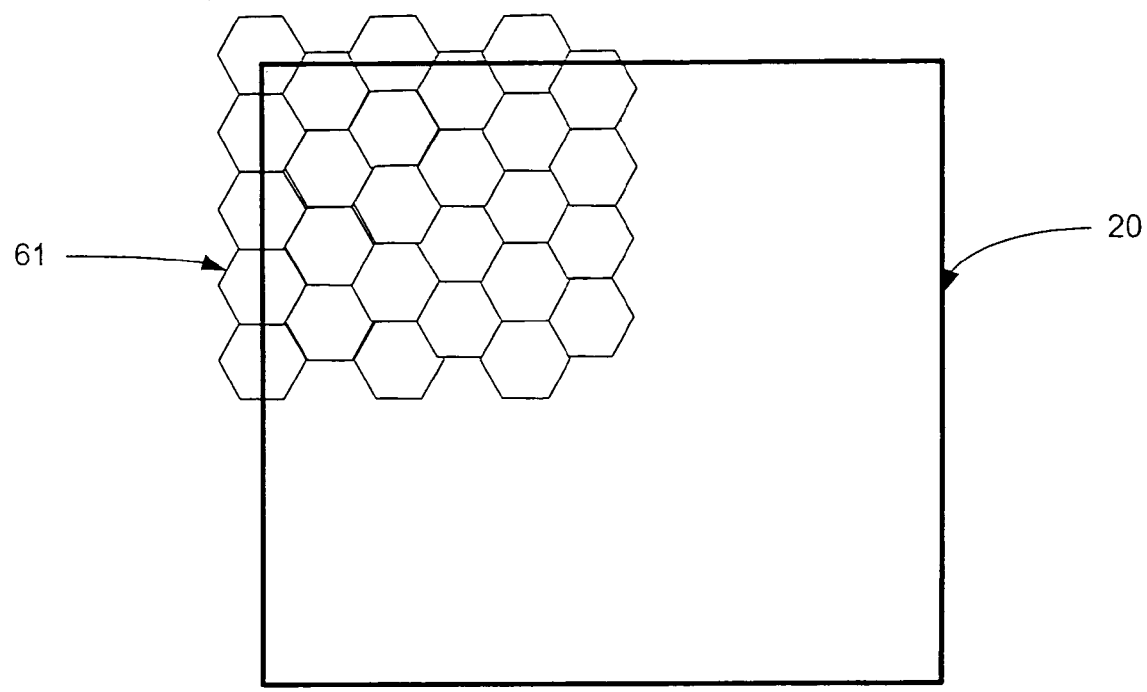
FIGS. 22a and 22b depicts a plan view illustrating the ROMs of different resolution over-laid on the screen of the PTV.
Figure 22B:
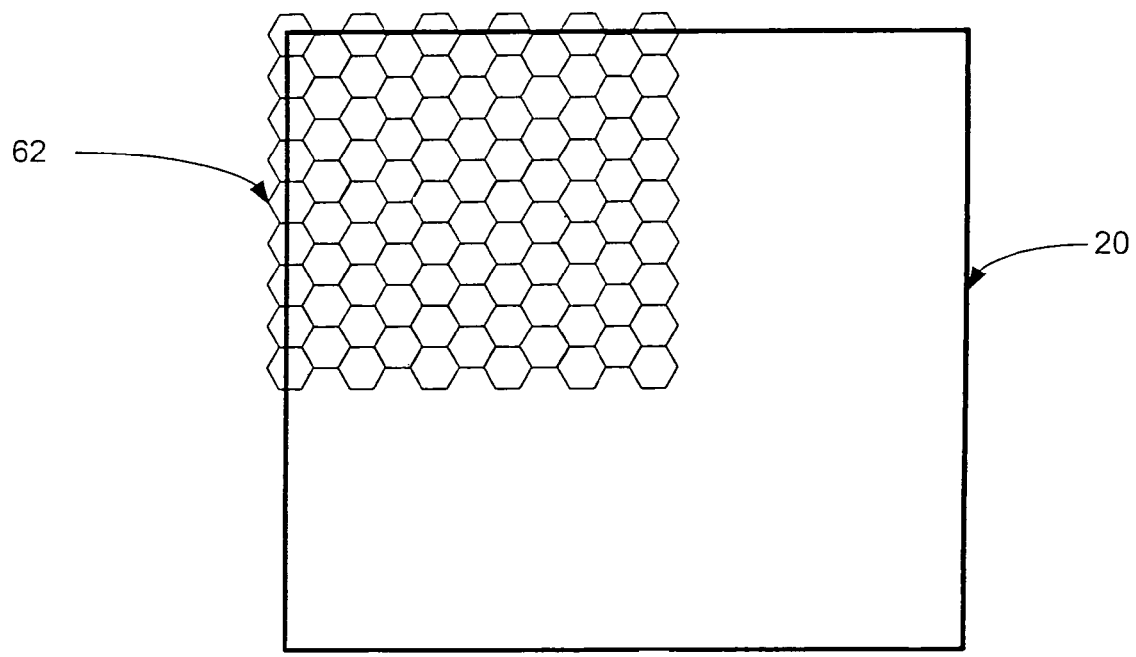

An alternative would be to utilize two (2) or more ACP detector systems 42 placed in the same PTV and having two (2) or more optical elements 44 corresponding to different size ROMs. This relieves need to have the CRTs moderately converged down to the size of a desired ROM before the ACP runs. For example, as indicated by FIGS. 22*a* and 22*b*, the lenses of the optical element of the first ACP detector system each map a larger portion of the screen 20 into each ROM's 61 than the portion of the screen 20 mapped into each ROM 62 by the lenses of the optical element of the second ACP detector system. Assuming that the initial alignment of the CRTs is no worse than the ROMs 61 of the first ACP detector system can handle without aliasing, and so long as the first ACP detector system can place the spots close enough to the right location that the spots all land within their appropriate ROMs imaged by the second ACP detector system, then the ACS can converge the beams of the CRTs to the resolution of the second ACP detector system. Thus, the CRTs can be roughly converged using the first ACP detector system, and then more finely converged using the second ACP detector system.

Figure 23:
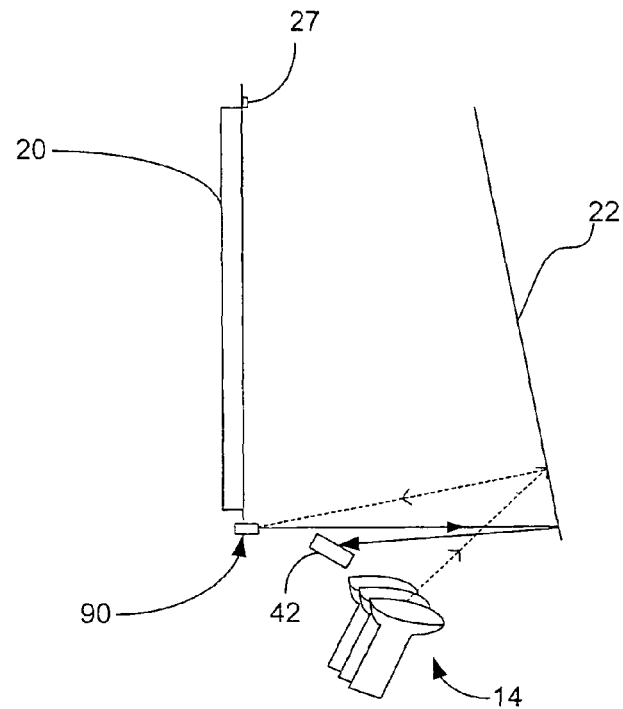
FIGS. 23, 24a and 24b depict partial side views illustrating a PTV embodiment comprising a wireless button system.
Figure 24A:
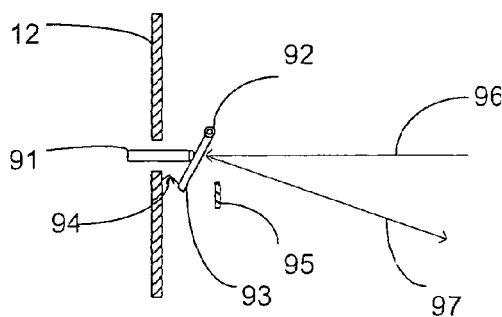
Figure 24B:
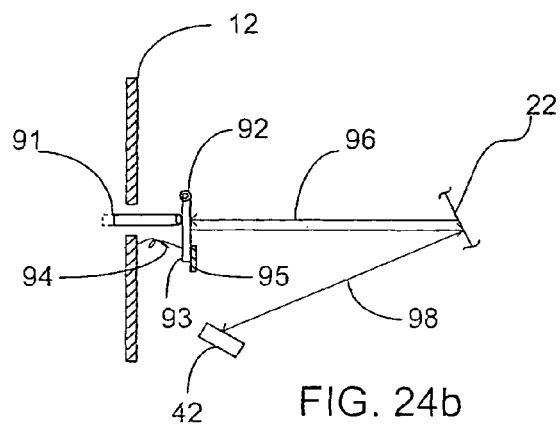
Figure 25:
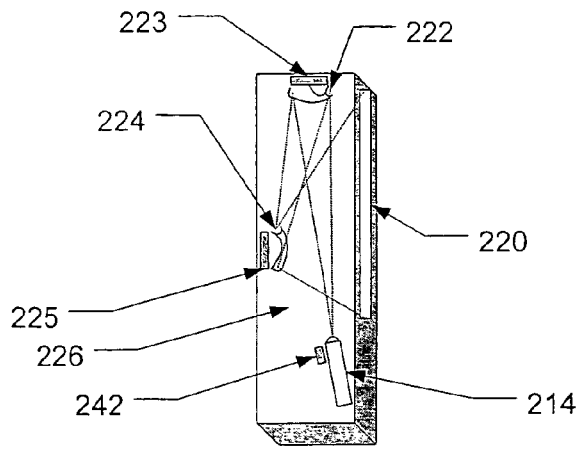
FIG. 25 depicts a side view illustrating an alternate embodiment of a PTV comprising an automated convergence system in accordance with the present invention.

In another preferred embodiment of the present invention shown in FIGS. 23, 24*a* and 24*b*, the ACP detector system of present invention can be utilized to enable operation of the PTV's front panel buttons 91 without requiring an electrical connection between the buttons 91 and the PTV's CPU. The buttons 91, when pressed, preferably tilt a reflector 93 forward until the reflector 93 abuts a stop 95 and is positioned within the over scanned area. The ACP detector system first determines the location of each reflector 93 when the buttons 91 are pressed, and then scans the front panel keyboard periodically, when the raster is in that location, checking to see whether any button 91 was pressed. If so, the image signal 96, as shown in FIG. 24*b*, is reflected back to the ACP detector system 42 along signal path 98. If the button is not pressed, the image signal 96, as shown in FIG. 24*a*, is reflected by the reflector 93 along signal path 97 into space in the light box of the PTV.

The reflector 93 is preferably coupled at one end to a pivot 92 that allows it to swing back and forth in the plane of the page. A spring 94 is preferably coupled to the other end of the reflector 93 and the PTV cabinet 12 to draw the reflector 93 and button 91 back to a non-depressed state once the button 91 is released.

Figure 4:
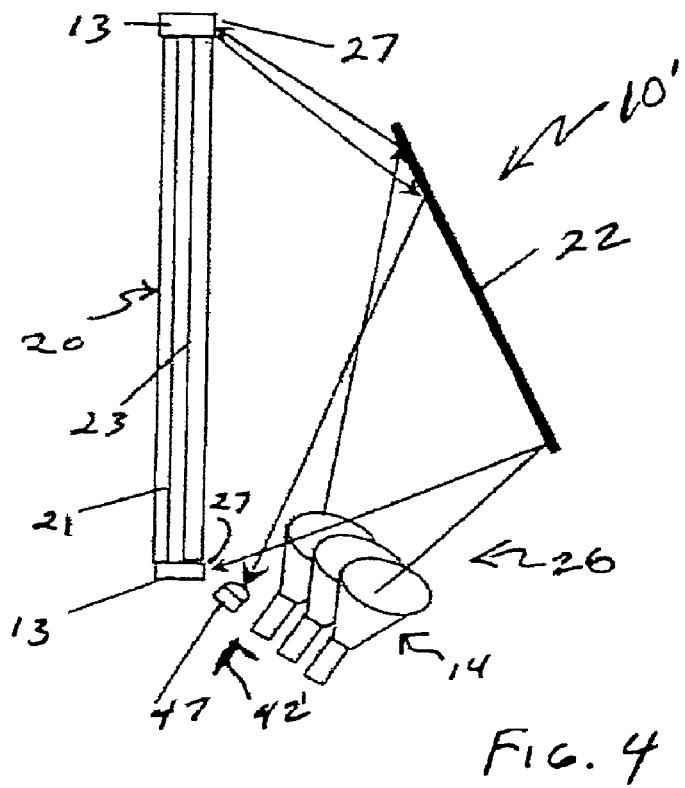
FIG. 4 depicts a partial detail side view of the PTV shown in FIG. 1 including another preferred embodiment of an automatic convergence system of the present invention using a single photocell and fish— or insect— eye lens.

Turning to FIG. 4, an alternative embodiment of the PTV 10' of the present invention is shown. In particular, the ACP detector system 42' preferably includes a detector element 47 comprising a single photocell with lens, such as, e.g., a fish eye (single element) or insect eye (multi-element) lens, coupled thereto to direct light to the surface of the photocell. The detector element is situated near the projection system 14 inside the light box 26 of the PTV 10' in a position so that it can sense light from anywhere on the inside of the screen frame 13, which includes the screen 20 and over scanned area 25. The projection system 14 may comprise single projector systems such as LCD and DLP systems as well as multi-projector systems such as multiple CRTs or multiple digital display chips. In an automatic convergence mode, the PTV's microprocessor 41 preferably instructs the TV OSD controller 50 to cause the projection system 14 to display a black image with a moving red, green, blue or white spot, which, due to the inherent over scan of a PTV, will enter the over scanned region 25 where the beacon dots 27 are located. When the spot of light hits one of the beacon ("shiny spots") dots 27 on the screen frame 13, the photocell will detect an increase in the ambient light. The microprocessor 41 will then "learn" where the shiny spot is and can compare the location to it's internal data of where the spot should be. The microprocessor 41 can then adjust the deflection shaping circuitry 49 to correct the electronic location of the spot. This process is then repeated for all the remaining spots or beacon dots 27. In addition to screen alignment and convergence, the ACP detector system 42' can be used to detect the pressing of buttons on the front panel keyboard by scanning the button panel with a moving spot and recording the time/position of the spot when the detected brightness occurred to determine which button was pressed.

Turning to FIGS. 25-29, another alternative embodiment of the present invention is shown. In particular, an ACP detector system of the present invention simplifies construction of a folded-optical system in "nearly-flat" rear projection TVs, whether implemented by multiple-optical-path technologies (e.g. CRTs) or by single-optical-path technologies (e.g. DLP or LCD). FIG. 1 shows a "nearly-flat" rear-projection TV 210 comprising a projection system 214 coupled to a first mirror 222 which is coupled to a second mirror 224, which in turn is coupled to the screen 220. The projection system 214 as shown comprises a single projector using LCD, DLP and the like, but may comprise multi-projector technology using CRTs, multiple digital chips and the like. In operation, the projection system 214 directs an image towards the first mirror 222, where it is deflected to the second mirror 224 and then to the screen 220. The shallowness of the display's enclosure 211 requires that the physical alignment between the first and second mirrors 222 and 224, and between the first and second mirrors 222 and 224 and the screen 220, be maintained very accurately. To maintain accurate alignment, the first and second mirrors 222 and 224 are outfitted with positioning devices 223 and 225, respectively. The positioning devices 223 and 225 each preferably include a range of about one to six linear motors such as inch worm actuators and the like. These actuators move the first and second mirrors 222 and 224 along one or more axes to correct for misalignment. The preferred number of such motors or actuators in the positioning devices 223 and 225 is determinable by the failure modes expected in the mechanical components to which the mirror and positioning device are mounted (e.g. how it might deform in shipping or over time.)

Figure 26:
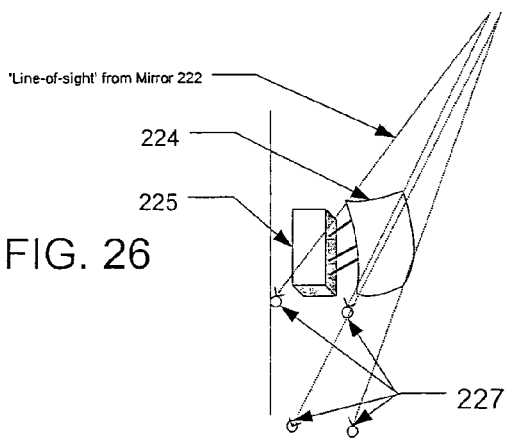
FIG. 26 depicts a partial side view of the PTV shown in FIG. 25.
Figure 27:
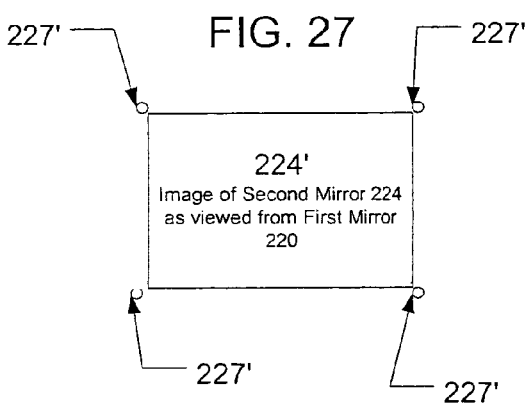
FIG. 27 depicts a plan view illustrating an image of a second mirror as viewed from a first mirror in the PTV shown in FIG. 25.
Figure 28:
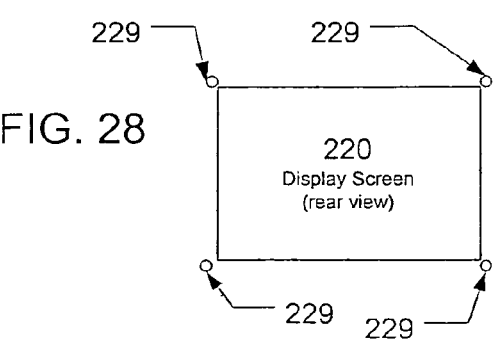
FIG. 28 depicts a plan view illustrating an rear image of the display screen of the PTV shown in FIG. 25.
Figure 29:
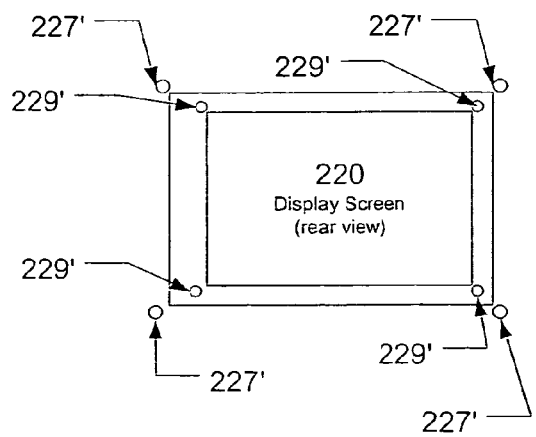
FIG. 29 depicts a plan view illustrating an image of a second mirror and display screen in the PTV shown in FIG. 25 when properly aligned.

Referring to FIG. 26, four beacon dots 227, preferably red, are shown painted on the back wall 228 of the enclosure 211 in such a position that when viewed from the first mirror 222, the beacon dots 227 appear at the corners of the second mirror 224. See FIG. 27 which shows an image of the second mirror 224 as viewed from the first mirror 222 and which depicts images of the beacon dot 227' at the corner of the mirror 224. In order to correct alignment errors between the first and second mirrors 222 and 224, the projection system 214 sends red patterns (a 'moving' red spot or binary-search patterns) across the imaging area of the projection system 214. These red patterns are deflected by the first mirror 222 to the general area of the second mirror 224. When a portion of a projected pattern illuminates a red (reflective) beacon dot 227, an ACP detector 242, which is located in the light box 226 of the PTV 210 adjacent the projection system 214, senses the difference in reflected light. The PTV's microprocessor then instructs the PTV's OSD Control (see FIG. 5) to modify the projected pattern and project it across the imaging area of the projection system 214. The modified pattern is then measured by the detector 242. While following the process depicted in FIG. 14, the ACP detector system converge son a value representing the deviation in the detected position from the desired or expected position of the first mirror 222. By observing which of the second mirror's corner dots 227 are missing from the detector's image, the control software calculates errors of translation and/or rotation in the first mirror 222. The control software calculates a correcting movement and applies this to the first mirror 222 using the positioning device 223 so that the image of the second mirror 224 and its dots 227 again fills the field of view of the first mirror 222.

Next, the projection system 214 creates a green image while the detector 242 watches for changes in back-reflection from green beacon dots surrounding 229 the screen 220. As before, it derives error measurements from the differences between the expected and detected position of the beacon dots 229. The ACP detector system then corrects the position of the first and second mirrors 222 and 224 with positioning devices 223 and 225. When the projector system 214 is aligned properly with the screen 220, the image seen by the detector 242 resembles the image depicted in FIG. 29, which shows an image of the screen 220 superimposed over the second mirror 224.

In aligning multi-projector optical systems, the same principles apply as discussed in regard to FIGS. 25-29 above and single projector optical systems. In a multi-projection system (e.g. red, green, blue CRTs) white beacon dots are used around both the second mirror 224 and the screen 220. The software distinguishes the dots of the second mirror 224 by first storing an image of the beacon dots it sees, then adjusting the second mirror 224 slightly and comparing images. Anything that remained stationary was one of the second mirror's dots 227, and can be used for positioning the first mirror 222.

Alternatively, actuators such as servo motor drives can be used to move the digital device (or devices) to achieve proper alignment of the digital device image(s) with the viewing screen in multiple (nearly flat) or single mirror systems in accordance with the methods described above. Furthermore, in the case of multiple digital device displays 318, such actuators 320 can also be used to align the image from each device 318 to achieve properly indexed images much the same way that CRT convergence is accomplished above.

Figure 30:
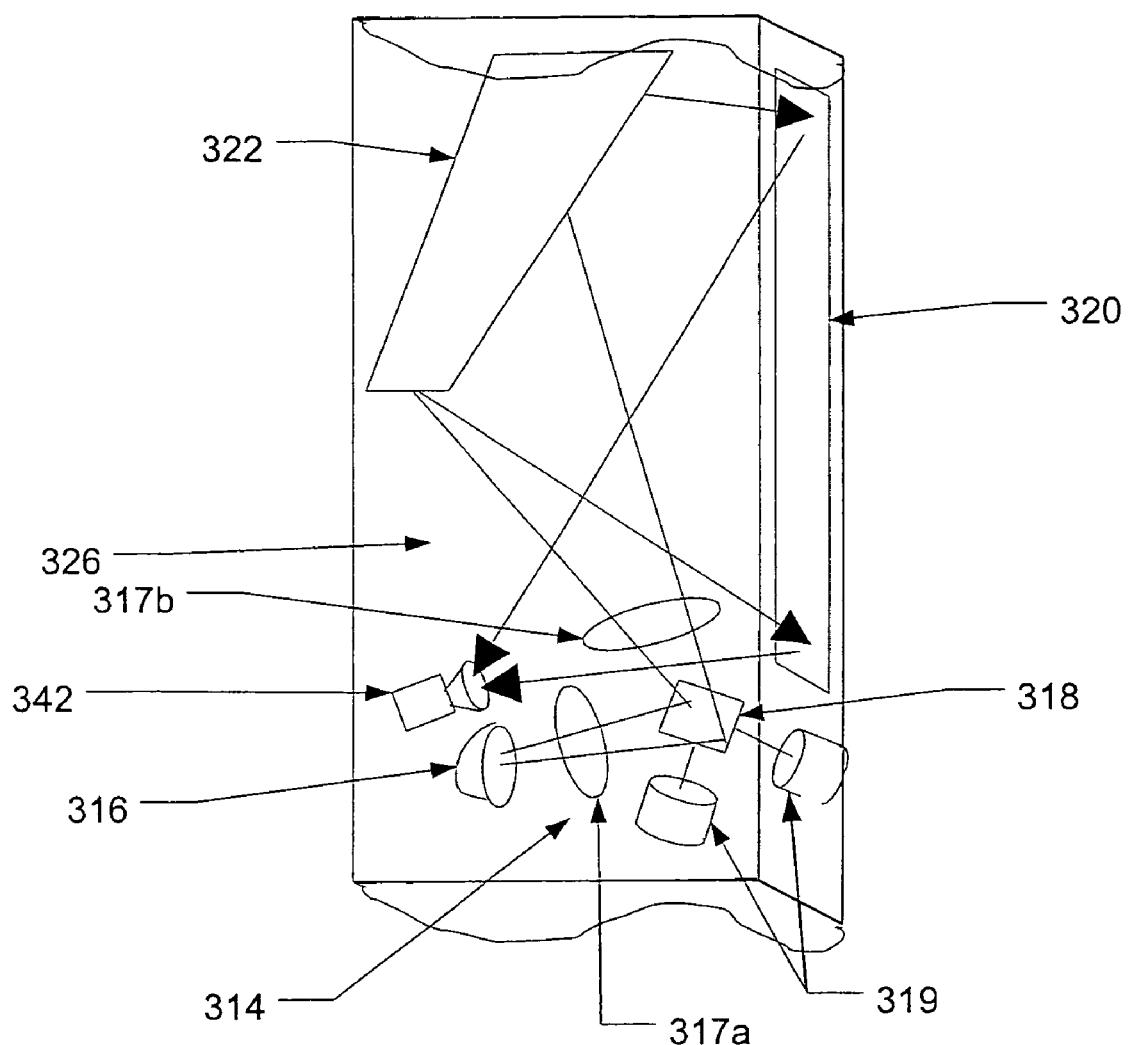
FIG. 30 depicts a partial detail side view of another preferred embodiment of a PTV including the automatic convergence system of the present invention and digital imaging device(s) with actuators.

As shown in FIG. 30, an alternative embodiment of the PTV 300 of the present invention includes an optics system 314 coupled to a mirror 322 and a screen 320. An ACP detector system 342 situated near the projection optics system 314 inside the light box 326 of the PTV 300 in a position so that it can sense light from anywhere on the inside of the screen frame, which includes the screen 320 and over scanned area. The optics system 314 comprises a lamp or light source 316 coupled through a lens 317a to a digital imaging device (s) 318 which is coupled through a lens 317b to the mirror 322. Actuators, 319, such as servo motor drives, are coupled to the digital imaging device(s) 318 to move the digital imaging device(s) 318 to achieve proper alignment of the digital device image(s) with the viewing screen in multiple (nearly flat) or single mirror systems in accordance with the methods described above.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, unless otherwise stated, and the invention can be performed using different or additional process actions, or a different combination or ordering of process actions. As another example, each feature of one embodiment can be mixed and matched with other features shown in other embodiments. Features and processes known to those of ordinary skill may similarly be incorporated as desired. Additionally and obviously, features may be added or subtracted as desired. Accordingly, the invention is not to be restricted except in light of the attached claims and their equivalents.

What is claimed is:

1. A projection system comprising,
    a projection television cabinet,
    a screen coupled to the projection television cabinet,
    a projection unit separate from and optically coupled to the screen,
    wherein the projection unit is operatively connected to the projection television cabinet,
    a plurality of beacon dots positioned about the periphery of the screen,
    a detection system optically coupled to the screen and the plurality of beacon dots, and
    a deflection shaping system operably coupled to the projection unit and the detection system, wherein the deflection shaping system further comprises at least one positioning device that manipulates the projection unit.

2. The projection system of claim 1 wherein the detection system includes a photocell and a lens coupled to the photocell.

3. The projection system of claim 2 wherein the lens is a fish eye lens.

4. The projection system of claim 2 wherein the lens is an insect eye lens.

5. The projection system of claim 1 wherein the detection system comprises an optical element and a detector element comprising an array of photodetectors, the optical element being adapted to map a plurality of regions of measurement (ROMs) onto the detector element.

6. The projection system of claim 5 wherein the optical element comprises an array of lenses.

7. The projection system of claim 6 wherein the lenses are convex and hexagonal.

8. The projection system of claim 6 wherein the lenses are Fresnel lenses.

9. The projection system of claim 5 wherein the optical element comprises a hologram.

10. The projection system of claim 1 wherein the deflection shaping system further comprises deflection shaping circuitry used to maneuver a CRT beam.

* * * * *